United States Patent [19]

Young

[11] 4,133,668

[45] Jan. 9, 1979

[54] MULTICOMPONENT SOIL SUPPLEMENT

[75] Inventor: Donald C. Young, Fullerton, Calif.

[73] Assignee: Union Oil Company of California, Brea, Calif.

[21] Appl. No.: 805,130

[22] Filed: Jun. 9, 1977

[51] Int. Cl.$^2$ .................. C05D 9/02; C05B 15/00; C05B 19/00

[52] U.S. Cl. ........................................ 71/11; 71/27; 71/64 D; 264/7

[58] Field of Search ................. 71/64 F, 31, 64 G, 11, 71/63, 64 DB, 64 DC, 27, 23, 15, 64 D; 264/7, 11, 12, 13, 14; 252/309, 189; 424/164

[56] References Cited

U.S. PATENT DOCUMENTS

| | | | |
|---|---|---|---|
| 2,774,660 | 12/1956 | Cook et al. ............................ | 264/14 |
| 3,295,950 | 1/1967 | Blouin et al. ......................... | 71/64 F |
| 3,342,577 | 9/1967 | Blouin et al. ..................... | 71/64 F X |
| 3,567,419 | 3/1971 | Dean et al. ............................ | 71/64 F |
| 3,637,351 | 1/1972 | Young et al. ....................... | 264/13 X |
| 3,663,478 | 5/1972 | Kuhre et al. ....................... | 252/309 X |
| 3,769,378 | 10/1973 | Young et al. ............................ | 264/13 |
| 3,982,920 | 9/1976 | Cross et al. ........................... | 71/27 X |
| 4,024,210 | 5/1977 | Chalmers ............................... | 264/11 |
| 4,026,694 | 5/1977 | Cross et al. ............................. | 71/11 |

FOREIGN PATENT DOCUMENTS 2340638  2/1975  Fed. Rep. of Germany ........... 71/64 F

OTHER PUBLICATIONS

Kittams; Use of Sulfur for Increasing the Availability of Phosphorous in Rock Phosphate; 1968; Doctoral Thesis for U. of Wisconsin; pp. 4–12, 88–93.

*Primary Examiner*—Kenneth M. Schor
*Attorney, Agent, or Firm*—Richard C. Hartman; Dean Sandford; Michael H. Laird

[57] ABSTRACT

Homogeneous solid fusions of particulate mineral nutrients in a continuous rhombic sulfur matrix containing at least about 50 weight percent sulfur are disclosed. These materials are obtained by dispersing throughout a sulfur melt at a temperature of 120° to about 400° C. a nutrient-hydrocarbon comixture containing sufficient hydrocarbon to thoroughly wet all surfaces of the mineral nutrient, preferably sufficient to form a suspension of the nutrient in the hydrocarbon, followed by cooling to form the solid fusion. These materials have particular utility in agronomic applications as soil supplements for supplying both sulfur (as sulfate) and mineral nutrients at a continuous, regulated rate from inexpensive raw materials.

8 Claims, No Drawings

MULTICOMPONENT SOIL SUPPLEMENT

BACKGROUND

Due to the increasing demands on the agricultural industry, there is a commensurate need for supplementing plant nutrients, either by soil or foliar application. These nutrients include a variety of minerals such as phosphorus, zinc, iron, copper, magnesium, manganese, molybdenum and boron. Elemental sulfur supplies soluble sulfate. It has the further advantage of reducing soil alkalinity.

It is often desirable to supplement soil concentrations of more than one of these nutrients in a single application. Thus it would be beneficial to have a single nutrient combination in an easily handleable form that would not segregate during transport or application.

Obviously, all of the nutrients could be supplied individually; and that procedure has the equally obvious advantage of allowing immediate on-site variation of nutrient concentration. However, it has the disadvantage that all nutrients are not maintained in immediate proximity to each other. In some cases this factor is not particularly significant. However, I have found that bacterial sulfur oxidation creates an acidic environment in the vicinity of the sulfur particles and that this environment can convert insoluble mineral nutrients such as mineral oxides, carbonates and sulfides, to soluble sulfates. This acidification even improves the mobility of nutrients applied as soluble compounds in calcareous soils by reducing the tendency of otherwise mobile compounds to convert immobile hydroxides, oxides, or the like. These nutrients must be made available to the plant roots in a soluble, mobile form to allow their assimilation by the crop.

The acidizing effect of elemental sulfur applied in any reasonable dosages, e.g., 20 to 800 pounds per acre, exists only, or at least to a large extent, in the area adjacent the sulfur particle. Thus, at least in calcareous soils, soil pH will increase with distance from the particle surface. Due to this effect and the beneficial influence of sulfur acidification on nutrient mobility, particularly on the conversion of insoluble, immobile compounds to mobile forms, it would be desirable to assure that all of the applied nutrient is fixed in the immediate vicinity of, and preferably within, the sulfur particle. It is even more desirable that the nutrient compound be evenly distributed throughout the matrix of the sulfur particle to assure gradual nutrient release rather than a slugging effect that would result from alternative procedures such as surface coating.

There are a number of mineral nutrient sources. Some are soluble such as the sulfates, nitrates and complexes with chelating agents, all of which are known in the agricultural industry. Inexpensive nutrients can be obtained as the oxides, sulfides and carbonates, the oxides being particularly preferred due to availability and low cost. However, in an attempt to form homogeneous combinations of these supplements with molten sulfur I discovered that they could not be distributed throughout the sulfur melt even with reasonably severe agitation. While better distribution, if not homogeneous combinations, might be obtained with extremely high shear mixing techniques in some cases, such techniques increase capital cost and operating expense.

Therefore, it is one object of this invention to provide a method for producing homogeneous, solid fusions of inexpensive, finely divided mineral nutrients in a continuous rhombic sulfur matrix. Another object is the provision of an improved continuous process for the formation of such homogeneous solid fusions. Yet another object is the provision of improved, homogeneous solid fusions of inexpensive mineral nutrients dispersed throughout a continuous rhombic sulfur matrix which assure an even, gradual nutrient release from the sulfur particles as a result of gradual, bacterial oxidation. Another object is the provision of methods for producing such mineral-sulfur solid fusions that result in little or no nutrient loss during manufacture, e.g., by leaching by aqueous quench media.

In accordance with one embodiment, homogeneous solid fusions of particulate mineral nutrients dispersed in a continuous rhombic sulfur matrix are obtained by dispersing throughout a sulfur melt a nutrient-hydrocarbon comixture containing at least about 10 weight percent of a finely divided water-insoluble plant nutrient compound and at least about 2 weight percent of a non-polar hydrocarbon. The hydrocarbon concentration must be at least sufficient to completely wet the exterior surfaces of the finely divided nutrient. Mild agitation is sufficient to assure even distribution of the nutrient-hydrocarbon comixture throughout the melt. The resulting suspension is then cooled to a temperature below the melting point to form blocks or particles of the homogeneous, nutrient-sulfur fusion as desired.

The nutrient compounds are selected for their relatively low cost, availability and water insolubility. Water insolubility is particularly desirable in the preferred embodiment which involves comminuting and solidifying the sulfur-nutrient melt by contacting with water. Such nutrients include calcium phosphate and the oxides, sulfides and carbonates of zinc, iron, copper, magnesium, manganese, molybdenum and boron. Of the nutrients other than phosphorus, the oxides are particularly preferred due to their very low solubility, availability and low cost.

To one degree or another, all of these materials suffer from the disadvantage that they can be dispersed in molten sulfur only with considerable difficulty, if at all. Thus the formation of a completely homogeneous distribution of the nutrient compound in the sulfur melt prior to quenching is difficult if not impossible. I have found that this difficulty can be overcome by assuring that all surfaces of the nutrient compound are coated with a non-polar hydrocarbon prior to admixture with the sulfur melt.

The same is true of the insoluble calcium phosphate source. By these methods the phosphate can be easily and uniformly dispersed in molten sulfur in relatively high concentrations, e.g., up to about 50 weight percent. The combinations also have other notable advantages in agricultural use.

Calcium phosphates are widely available as several minerals such as apatite, usually containing fluorine, e.g., fluoro-apatite, some copyrolites and some phosphorites of which significant deposits exist in both this and foreign countries.

Available, i.e., soluble phosphate, is usually derived from insoluble calcium phosphate by dissolving the calcium phosphate in sulfuric acid to release phosphoric acid and calcium sulfate (gypsum) both of which have agronomic value. The product acid, generally known as wet-process phosphoric acid, is a widely used industrial and agricultural commodity. The usual manufacturing methods require the preliminary manufacture of sulfuric acid and, in the great majority, if not all cases, require separation of the dilute phosphoric acid from insoluble calcium sulfate byproduct.

The most widely used sulfuric acid manufacturing procedure involves sulfur oxidation to sulfur dioxide which is then converted to sulfur trioxide over a vanadium catalyst followed by hydrolysis to the acid. Once obtained, this acid is used to convert insoluble calcium phosphate (from fluoroapatite or otherwise) to insoluble calcium sulfate and dilute phosphoric acid. The phosphoric acid is then recovered in the supernatant phase and concentrated by conventional procedures. Calcium sulfate is recovered by filtration. Both of these materials can be used as soil additives.

I have found that the embodiment of this invention employing crude phosphate rock eliminates all of the manufacturing steps involved in the conventional production of calcium sulfate and phosphoric acid referred to above. It does so in a very effective manner in that the resulting sulfur fusions, being homogeneous, assure continuous availability of soluble phosphate and sulfur as calcium sulfate at a rate dependent only on the rate of sulfur-active bacterial action.

In this respect another advantage of this invention is that the activity of heterotropic thiobacillae is increased due to the presence of hydrocarbon in the sulfur matrix. The hydrocarbon provides a carbon source for the bacteria thereby accelerating their growth and consequently the conversion of sulfur to sulfuric acid. By this technique the amount and type of hydrocarbon can be controlled or selected to control the rate of phosphate and sulfur release. All of these things are accomplished with very inexpensive, readily available minerals, e.g., elemental sulfur and crude phosphate rock.

Accordingly, the methods and compositions of this invention have several significant advantages over those known to the prior art. They allow for the use of inexpensive readily available water-insoluble oxides, sulfides and carbonates. They require much less agitation or shear to obtain adequate nutrient distribution than is the case with alternative methods. They result in easily obtained, homogeneous, macronutrient dispersions in both the sulfur melt and product matrix. They minimize or completely eliminate nutrient loss during formulation or shipment, and they do not so weaken the product particles as to make them friable in transport or use.

On the contrary, I have found that the hydrocarbon results in several advantages other than nutrient dispersibility. The product particles, when formed as such, are more fluid than are particles not containing hydrocarbon. They have significantly less tendency to dust or autoignite during transport or use and they do not bridge and plug transportation and application equipment. Product homogeneity assures more uniform nutrient release. The hydrocarbon also accelerates heterotrophic bacteria activity and therefore increases nutrient release rate. Due to the low shear mixing made possible by these methods, they are readily adaptable to continuous, low shear formulation procedures.

The preferred metal nutrients are zinc, iron, copper, magnesium, manganese, molybdenum and boron in the form of the corresponding oxides, carbonates and sulfides. The oxides are particularly preferred for the reason discussed above. I have also found that these materials, particularly the oxides, can be compounded into very concentrated hydrocarbon comixtures to produce fluid suspensions containing up to 75 weight percent of the metal oxide. I have also discovered that such high concentrations, e.g., above 30 weight percent of the metal oxide, particularly the oxides of zinc and iron, can be obtained only under anhydrous conditions. Accordingly, oxides containing water should be heated to a temperature sufficient to drive off water, e.g., at least about 110°, preferably at least about 120° C., for a period sufficient to produce an anhydrous powder. Care should also be taken to assure that the oil is substantially anhydrous so that the total composition, i.e., metal oxide and oil, contains less than 0.5 weight percent water. Under these conditions, relatively stable nutrient-hydrocarbon suspensions can be obtained with only minor agitation and can be maintained in that form with only periodic agitation.

This characteristic greatly facilitates nutrient-sulfur mixing in either batch or continuous operations. It allows for metering of the hydrocarbon-nutrient suspension directly into the melt at a controlled rate or in otherwise controlled amounts to provide a composition having the desired nutrient content. Furthermore, the availability of high nutrient content suspensions also minimizes the amount of hydrocarbon required to transport the desired amount of nutrient in a fluid form, when reduced hydrocarbon concentrations are desired. Similar suspensions can be obtained with the calcium phosphate sources referred to above.

The several components should be mixed in proportions sufficient to assure a product fusion containing at least about 50, preferably at least about 70, weight percent rhombic sulfur. The remainder of the product can comprise hydrocarbon and nutrient compound and/or other solid components such as fillers, clays and the like, as desired. These compositions can contain 1 to about 50, preferably 1 to about 20, weight percent of the hydrocarbon-nutrient comixture.

The hydrocarbon-nutrient suspension can contain as little as one percent nutrient but usually contains at least about 5, often at least about 10, and preferably about 10 to about 75 weight percent nutrient compound.

Better nutrient-hydrocarbon distributions, more stable comixture suspensions, and better product homogeneity are obtained when the nutrient compounds are added as finely divided particles. These are usually characterized as particles passing 50 mesh and preferably passing 100 U.S. Standard screen.

The hydrocarbon-nutrient combination can be added either as a nutrient-hydrocarbon suspension or as the finely divided solids containing sufficient hydrocarbon to completely coat all particle surfaces. Thus, the comixture should contain at least about 2 weight percent, preferably 30 to 95 weight percent hydrocarbon. The fluid suspensions containing at least about 30 weight percent hydrocarbon are presently preferred, particularly in continuous processes.

Due to the characteristics of these hydrocarbon-nutrient compound comixtures, they can be evenly distributed throughout the sulfur melt to form a homogeneous distribution under very low shear conditions, at least as compared to the shear rates required to obtain homogeneity by other procedures. For instance, homogeneous compositions can be obtained at the shear rate existing in turbulent pipeline flow within a reasonable period of time, i.e., within 10 seconds or less. Thus, adequate mixing can be obtained at shear rates corresponding to a linear flow velocity only 10 percent above the maximum laminar flow velocity in a pipeline. The optimum amount of shear and time required for any operation can be easily determined by testing the design composition at several shear rates and times, and selecting the best combination by interpolation.

The nutrient-hydrocarbon comixture can be added to the sulfur melt at a temperature of 120° to about 400° C., preferably 120° to about 250° C. by any one of several well-known procedures. However, in both batch and continuous operations it is presently preferred to meter a fluid suspension of the comixture into the sulfur melt. This procedure facilitates more accurate composition control and leads to homogeneous products with only minor agitation of the sulfur-comix combination. It is particularly adaptable to continuous operations in which the comixture and sulfur melt are continuously blended such as in an in-line mixer. Thus the sulfur melt can be continuously transferred from a sulfur melt reservoir or other container and passed by pumps or under pressure into admixture with the nutrient-hydrocarbon comixture which itself is continuously metered from a comix container. The container is preferably provided with agitation means for maintaining an even suspension of the nutrient compound and hydrocarbon prior to combination with the sulfur melt. These two streams are continuously mixed by any one of numerous known in-line mixers, surge tanks, or the like. The combination is then cooled or quenched to form the homogeneous fusion.

The hydrocarbons are preferably liquid at ambient conditions or, more appropriately, the temperature at which the nutrient compound-hydrocarbon comixture is formed. If this temperature is elevated it is essential only that the hydrocarbon be fluid at that temperature to allow adequate coating and mixing of the two components. The hydrocarbons should have a boiling point below the temperature at which the comixture is introduced to the sulfur melt to avoid flashing and hydrocarbon vapor evolution in the mixing apparatus.

Suitable hydrocarbons include virgin or partially refined crudes or synthetic crudes, e.g., derived from coal, oil shale or other origins of natural or synthetic paraffins, aromatics and/or alkyl aromatics. Illustrative are paraffin waxes, gas oils, crude oils, reduced crude oil residuum, naphtha, diesel oil, fuel oil, light and heavy gas oils, kerosene, jet fuel, 80 to 300 neutral oils, paraffin waxes, hydrocarbon homo- or hetero-polymer oils, waxes or thermoplastics such as polyolefins, polystyrene and the like.

The hydrocarbons should be non-polar and non-reactive with sulfur or other components of the composition at melt temperatures. They are preferably paraffinic, aromatic or alkyl aromatic, or combinations of these. From the standpoint of reactivity and toxicity to both plants and sulfur-active bacteria, the hydrocarbons preferably contain, at most, only minor amounts of olefins, alkynes, alkenyl aromatics or compounds containing reactive or toxic functional groups such as hydroxyl, amino, ether, aldo, keto or carboxyl groups, or the like. However, this exclusion does not apply to most halogenated hydrocarbons which are generally unreactive, at least at the lower melt temperatures within the above ranges. Aromatics are somewhat more refractive to sulfur-active bacteria than are paraffinic hydrocarbons. Accordingly, paraffins or compositions consisting primarily of paraffins are particularly preferred for agronomic use.

These methods do not require surfactants to obtain homogeneous distribution of the comixture in the sulfur melt. In fact, such surfactants are preferably avoided at least in most applications due to their reactivity at melt temperatures and/or their toxicity or refractiveness to sulfur-active bacteria.

Moreover, surfactants would be largely wasted in the preferred particle-forming techniques which involve quenching and subdividing the sulfur-comix blend by contacting with liquid water under high shear conditions. At least some of the surfactant would be abstracted from the sulfur phase under these conditions and surfactant removal unavoidably results in hydrocarbon leaching from the sulfur matrix.

The melt can be cooled and solidified, and, if desired, can be comminuted by any one of several procedures. I have found that these melt blends have certain advantages over other formulations in water quenching systems. Very little, if any, hydrocarbon or nutrient is lost to the water phase. Thus the melt can be cooled into blocks and crushed to the desired particle size or it can be air cooled by conventional methods, e.g., by prilling.

Particularly preferred methods involve water quenching by any one of several techniques. The melt can be sprayed into a standing or agitated aqueous quench in which case particle size can be regulated by spray size and agitation severity. Other methods involve pouring a melt into an agitated aqueous quench, in which case particle size is determined primarily by agitation severity.

A particularly preferred method is disclosed in my U.S. Pat. Nos. 3,637,351, 3,769,378 and 3,830,631, incorporated herein by reference. Briefly, these methods involve contacting a high velocity water spray with a high velocity spray of the homogeneous sulfur-hydrocarbon melt to form a highly turbulent intersection zone of the two sprays in which the melt is simultaneously subdivided and quenched into the porous particles similar to those described in the noted patents.

Whichever method is used, it is often desirable to obtain particles having diameters of about one inch or less, usually about one-half inch or less. The methods of my abovementioned U.S. Patents can produce particles having diameters of about 0.02 to about 0.11 inch, and bulk densities below about 1.9, generally below about 1.3, preferably about 0.9 to about 1.3 grams per cc. They are further characterized by porosities of at least about 0.04, generally about 0.04 to about 0.15 cc's per gram, and internal surface areas of at least about 20, preferably between about 30 and about 100 square meters per gram.

EXAMPLE 1

In this operation, zinc oxide powder was combined with molten sulfur in the absence of oil. This combination was then comminuted and quenched as described in my U.S. Pat. Nos. 3,637,351, 3,769,378 and 3,830,631. The powdered zinc oxide (minus 100 U.S. Standard Sieve) was gradually added to agitated molten sulfur at a temperature of about 120° C. and agitation was continued to disperse the additive. Zinc concentration was about 3 weight percent as the oxide.

This suspension was passed to and ejected from the sulfur barrel of the apparatus while water was passed to and ejected from the coaxial water barrel surrounding the sulfur barrel, so that both the sulfur and water streams were emitted from their respective barrels at high velocity and mixed at the vena contracta of the two streams. The product had particle diameters of about one-quarter inch and less. Sample particle analysis for zinc established that the nutrient metal concentration varied from 0 up to 30 weight percent between particles showing that very poor distribution had been obtained.

EXAMPLE 2

This operation involved the preparation of several zinc oxide-hydrocarbon semi-stable suspensions of varying zinc concentration. The hydrocarbon was a surfactant-free, nonphytotoxic 90N paraffinic spray oil containing less than 15 weight percent aromatics and having a melting point of −15° C. and an initial boiling point of 315° C. The zinc oxide was powdered reagent grade Baker and Adams zinc oxide, all of which passed 100 U.S. Standard screen.

The 90N oil was placed in a container agitated with a 3-blade stirrer and the zinc oxide was gradually added with continued agitation to produce seven different compositions containing 20, 30, 40, 50, 60, 70 and 75 weight percent zinc oxide. Even at the higher concentrations these compositions were fluid, relatively stable suspensions. Although concentration gradients gradually developed upon standing, homogeneous redistribution of the zinc oxide was readily achieved with only mild agitation.

During this operation I noted that some of the suspensions became very viscous even before all of the zinc oxide had been combined with the oil. Analysis of the systems established the presence of more than 0.5 weight percent water. Heating the mixture to a temperature of 120° C. (which was sufficient to reduce the water content to less than 0.5 weight percent $H_2O$) rapidly converted the mixtures to fluid, stable suspensions.

This study also established that stable, fluid comixtures can be obtained at very high nutrient loadings, e.g., 40 to 75 percent nutrient expressed as the oxide, provided that sufficiently anhydrous conditions are maintained. This observation is particularly applicable to batch, and especially continuous processes in which high nutrient-oil ratios are desired. While this finding applies to all compositions discussed herein, it is particularly advantageous with the oxides of zinc, iron, magnesium and manganese.

EXAMPLE 3

This operation involved the preparation of homogeneous, sulfur-zinc oxide-oil fusions using zinc oxide-hydrocarbon suspensions similar to those described in Example 2. Two suspension concentrations containing 20 and 50 weight percent of the reagent grade zinc oxide described in Example 2 in the 90N oil were employed to obtain homogeneous fusions containing 0.5, 1, 2, 3, 5, 10, 15 and 25 weight percent zinc as the metal. The 20 weight percent zinc oxide in oil suspension was used to produce the fusions containing 2 weight percent zinc and less. The 50 weight percent zinc oxide suspensions were used for the higher concentrations.

The zinc oxide-hydrocarbon suspensions were produced as described in Example 2. These suspensions were then added to a sulfur melt by gradually pouring the suspension into molten sulfur at 125° to 130° C. with continuous stirring. The resulting blend was then poured into the vortex of a highly agitated 5-gallon water bath. This procedure resulted in the formation of particles having diameters of ¼ inch or less. Particle analysis by scanning electron microscope established that the zinc oxide was homogeneously distributed throughout the matrix of each particle and that it was evenly distributed throughout the entire particle population.

The water phase was also analyzed for zinc and hydrocarbon. Neither the zinc nor hydrocarbon could be detected, showing that there was no nutrient loss to the quench medium.

EXAMPLE 4

This operation involved the preparation of seven semistable suspensions of ferric oxide in the 90N spray oil described in Example 2. The ferric oxide was anhydrous, red pigment grade ferric oxide and was compounded with a 90N oil in amounts corresponding to 20, 30, 40, 50, 60, 70 and 75 weight percent of the oxide. Fluid, stable suspensions were obtained in each instance with only mild agitation.

EXAMPLE 5

Ferric oxide-hydrocarbon comixtures prepared as described in Example 4 and containing 20 and 50 weight percent $Fe_2O_3$ were used to produce homogeneous ferric oxide distributions in sulfur by the procedure described in Example 3. These compositions had concentrations of 0.5, 1, 2, 3, 5, 10, 15 and 25 weight percent iron expressed as the metal. The fusions containing 1 weight percent and less of iron were prepared with comixtures containing 20 weight percent $Fe_2O_3$. The higher concentrations were obtained with the 50 weight percent comixtures.

Uniform products having particle diameters of ¼ inch or less were obtained in each instance. Product homogeneity was confirmed by inspection of fractured particles.

EXAMPLE 6

Semi-stable suspensions of a multinutrient source in the 90N spray oil were obtained as described in Example 2 having nutrient concentrations of about 20, 30, 40, 50, 60, 70 and 75 weight percent total nutrient metal expressed as the oxides. The multinutrient source was a powdered, commercially-available, fertilizer minor nutrient adjuvant containing 25 weight percent iron, 27 weight percent zinc and 3 weight percent manganese expressed as the metals and present as the oxides. The adjuvant was a finely divided powder, all of which passed 100 U.S. Standard mesh. The mixtures were produced as described in Example 2 using the 90N spray oil there described. Semi-stable suspensions resulted in each case with only mild agitation.

EXAMPLE 7

A zinc oxide-sulfur-hydrocarbon fusion similar to those described in Example 3 was used to treat a Zinfandel grape vine with "little leaf" disease (zinc deficiency). Supplement particles were placed in a shallow trench beside the vine. Within one week all new leaves on the vine were healthy and of normal size and exhibited no evidence of "little leaf" disease which was still evident in the leaves produced prior to application.

EXAMPLE 8

A zinc oxide-sulfur-hydrocarbon fusion containing 3 weight percent zinc expressed as the metal similar to those described in Example 3 was used to treat the roots of an almond tree with symptoms of zinc chlorosis evidenced by misshapen leaves with chlorotic streaks. Several auger holes were drilled to the level of the tree roots. Supplement particles were placed in the holes which were then refilled. Within 3 to 4 months the tree showed no symptoms of zinc deficiency on either old or new foliage.

The fusions used in Examples 7 and 8 were prepared from zinc oxide. Yet the results obtained in each case contrast significantly with those expected with zinc oxide alone, in which case little or no improvement would occur within the same time span under comparable soil conditions.

I claim:

1. The method of producing a soil amendment comprising a homogeneous, solid fusion of particulate mineral nutrients and hydrocarbon evenly dispersed throughout a continuous rhombic sulfur matrix and said solid fusion also containing at least about 50 weight percent sulfur based on the total weight of said amendment, said method including the steps of (a) forming a sulfur melt at a melt temperature of about 120° to about 400° C., (b) dispersing throughout said melt about 1 to about 50 weight percent based on said amendment of a nutrient-hydrocarbon comixture wherein at least about 10 weight percent based on said comixture is a finely divided water-insoluble plant nutrient compound selected from the group consisting of calcium phosphate and zinc, iron, copper, magnesium, manganese, molybdenum, and boron oxides, sulfides and carbonates, and combinations thereof, the compound being coated with or suspended in at least about 2 weight percent of a nonpolar hydrocarbon based on the combined weight of said nutrient and non-polar hydrocarbon, said non-polar hydrocarbon being non-reactive with said sulfur at said temperature and being selected from the group consisting of paraffinic and aromatic hydrocarbons and combinations thereof having melting points below said melt temperature and boiling points above said melt temperature, and (c) cooling the resulting combination of said hydrocarbon and said nutrient homogeneously distributed throughout said sulfur matrix to a temperature below the sulfur melting point to form said homogeneous, solid fusion.

2. The method of claim 1 wherein said nutrient-hydrocarbon comixture comprises a fluid suspension of about 10 to about 75 weight percent of said nutrient mineral compound in said hydrocarbon based on the total weight of said comixture.

3. The method of claim 1 wherein said solid fusion comprises at least about 70 weight percent rhombic sulfur, said nutrient-hydrocarbon comixture is combined with said sulfur melt in an amount corresponding to about 1 to about 20 weight percent of said comixture based on the total weight of said solid fusion, said nutrient-hydrocarbon comixture comprises a fluid suspension of about 10 to about 75 weight percent of said nutrient mineral compound in said hydrocarbon, and said resulting dispersion is quenched and subdivided under conditions sufficient to form particles of said homogeneous, solid fusion having diameters of about 1 inch or less.

4. The method of claim 3 wherein said particles are formed by quenching said resulting dispersion in water under shearing conditions sufficient to comminute and solidify said suspension into said particles.

5. The method of claim 3 wherein said nutrient mineral compound is selected from finely divided, anhydrous oxides of zinc, iron, copper, manganese, magnesium, molybdenum and combinations thereof.

6. The method of claim 3 wherein said nutrient-hydrocarbon comixture contains at least about 5 weight percent of finely divided anhydrous zinc oxide and less than about 0.5 weight percent water.

7. The method of claim 1 wherein said nutrient-hydrocarbon comixture contains at least about 10 weight percent finely divided crude phosphate rock.

8. The method of claim 2 including the steps of continually transferring said sulfur melt from a sulfur melt source into admixture with said nutrient-hydrocarbon comixture continuously transferred from a supply of said nutrient-hydrocarbon comixture, continuously mixing said sulfur melt and said nutrient-hydrocarbon comixture and quenching the resulting dispersion of said nutrient-hydrocarbon comixture in said sulfur melt by contacting with water under shearing conditions sufficient to comminute and solidify said dispersion into particles of said homogeneous, solid fusion having diameters of about 1 inch or less.

* * * * *